(12) United States Patent
Scherzinger et al.

(10) Patent No.: US 6,881,297 B2
(45) Date of Patent: Apr. 19, 2005

(54) PROCESS FOR AERATING DISPERSIONS

(75) Inventors: Bernhard Scherzinger, Graz (AT); Helmuth Gabl, Graz (AT)

(73) Assignee: Andritz AG, Graz (AT)

( * ) Notice: Subject to any disclaimer, the term of this patent is extended or adjusted under 35 U.S.C. 154(b) by 210 days.

(21) Appl. No.: 10/386,787

(22) Filed: Mar. 12, 2003

(65) Prior Publication Data

US 2003/0155084 A1 Aug. 21, 2003

Related U.S. Application Data

(62) Division of application No. 09/776,123, filed on Feb. 2, 2001, now Pat. No. 6,585,854.

(30) Foreign Application Priority Data

Feb. 3, 2000 (AT) .............................. 167/2000

(51) Int. Cl.[7] ................................ D21C 5/02
(52) U.S. Cl. .............. 162/4; 162/55; 162/57; 209/170; 210/221.1; 210/221.2
(58) Field of Search ............... 162/4, 57; 209/170; 210/221.1, 221.2

(56) References Cited

U.S. PATENT DOCUMENTS

| | | | | |
|---|---|---|---|---|
| 4,331,534 A | * | 5/1982 | Barnscheidt | 209/164 |
| 4,347,128 A | * | 8/1982 | Barnscheidt | 209/170 |
| 4,447,157 A | | 5/1984 | Underwood | 366/137 |
| 4,704,204 A | | 11/1987 | Kaelin | 210/219 |
| 4,722,784 A | * | 2/1988 | Barnscheidt | 209/164 |
| 4,738,541 A | | 4/1988 | Weber | 366/152 |
| 4,842,777 A | | 6/1989 | Lamort | 261/79.2 |
| 5,465,848 A | | 11/1995 | Veh et al. | 209/170 |
| 5,762,416 A | | 6/1998 | LeSire | 366/136 |
| 5,911,703 A | | 6/1999 | Slate et al. | 604/68 |
| 6,217,761 B1 | | 4/2001 | Catanzaro et al. | 210/195.4 |
| 6,475,337 B1 | * | 11/2002 | Gabl et al. | 162/4 |

FOREIGN PATENT DOCUMENTS

JP         040 48921        2/1992

\* cited by examiner

Primary Examiner—Steve Alvo
Assistant Examiner—Kara M. Parker
(74) Attorney, Agent, or Firm—Alix, Yale & Ristas, LLP

(57) ABSTRACT

A device and process for aerating dispersions, particularly for flotation of pulp suspensions, in a de-inking process where the pulp suspension containing dirt particles is sprayed into a tank together with air. The air is injected at a minimum of two successive points and mixed with the suspension.

4 Claims, 4 Drawing Sheets

PROCESS FOR AERATING DISPERSIONS

This application is a divisional of application Ser. No. 09/776,123 (U.S. Pat. No. 6,585,854) filed on Feb. 2, 2001.

BACKGROUND OF THE INVENTION

This invention relates generally to apparatus and processes for aerating dispersions. More particularly, the present invention relates to apparatus and processes for aerating pulp suspensions during de-inking.

De-inking flotation is a mechanical process for removing impurities and ink particles from pulp suspensions produced particularly in waste paper treatment. This process requires the generating of gas bubbles in the appropriate quantity and size distribution. Hydrophobic substances or substances to which ampholytics are added to make them hydrophobic, such as ink particles or stickies, are carried to the surface of the liquid by the gas bubbles adhering to them and can be removed from the surface as scum. This is referred to as selective flotation because the pulp is discharged with the accept due to its hydrophile nature. Processes of this type are known in numerous geometric modifications, for example from DE 41 16 916 C2 or EP 0 211 834 B1, and have reached a high technical standard. Further, it has also proved successful to use self-priming injectors to generate gas bubbles and mix these with the pulp suspension. These injectors basically comprise a propulsive jet nozzle, a mixing or impulse exchange pipe, and a diffuser. Here, the liquid flow emerging from the propulsive jet nozzle according to the open jet principle generates under pressure. As a result, gas is sucked in and mixed with the liquid as a result of the impulse exchange between liquid and gas in the mixing pipe. At the exit from the diffuser used for energy recovery a dispersion of pulp and bubbles is formed. Use of the known processes and injectors, however, has shown several disadvantages in selective flotation of pulp suspensions.

The suction effect of the known injectors in operation with pulp suspensions is too weak and the bubble size distribution generated by the injector known does not have the optimum design to meet the requirements of selective flotation.

SUMMARY OF THE INVENTION

The invention is, therefore, based on the task of designing an injector with greater suction effect and optimum bubble size distribution for use in de-inking flotation.

The process according to the invention is thus characterized by the gas, particularly air, being sucked in by the effect of the injector at a minimum of two successive points and mixed with the suspension. Due to suction taking place in stages, the pulp can be loosened by the gas in the first stage, thus achieving a better spread of the free jet in the second stage, resulting in improved suction effect and corresponding bubble generating, particularly with a reduction in the fine bubble portion to avoid solids losses.

An advantageous further development of the invention is characterized by some 20 to 95% of the entire quantity of gas, particularly air, sucked in being taken in the first stage. Since intake of the quantity of gas, particularly air, is divided over several suction points, more even mixing of the suspension with the gas is obtained. This allows a specific suitable bubble size to be set.

A favorable configuration of the invention is characterized by the gas and liquid flow obtained by suction and mixing being transferred in a free jet after the first stage. As a result, use of the kinetic energy of the jet, in particular, can be improved for renewed intake of gas.

A favorable further development of the invention is characterized by the gas or air loading of the pulp suspension directly after being sprayed in amounting to approximately 50–150%.

The invention also refers to a device for aerating dispersions, particularly a flotation device for de-inking pulp suspensions with an injector, characterized by at least two suction points being arranged in series in flow direction. Due to suction taking place in stages, the pulp can be loosened by the gas in the first stage, thus achieving a better spread of the free jet in the second stage, resulting in improved suction effect and corresponding bubble generating, particularly with a reduction in the fine bubble portion to avoid solids losses.

A favorable further development of the invention is characterized by the injection channel widening after the first suction point. Thus, the kinetic energy of the jet can be put to good use in a favorable manner.

An advantageous further development of the invention is characterized by a panel being mounted at the end of the injector channel across the flow direction. This panel acts as a radial diffuser to recover energy from the liquid jet.

An advantageous configuration of the invention is characterized by the panel being mounted on a slant to the flow direction.

A favorable further development of the invention is characterized by the panel containing internals for targeted guidance of the flow. As a result, the injector can also be mounted in any desired position in the flotation cell.

A favorable configuration of the invention is characterized by a minimum of two injectors being mounted in parallel in the form of an injector group. With this design it is also possible to handle large throughputs accordingly.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
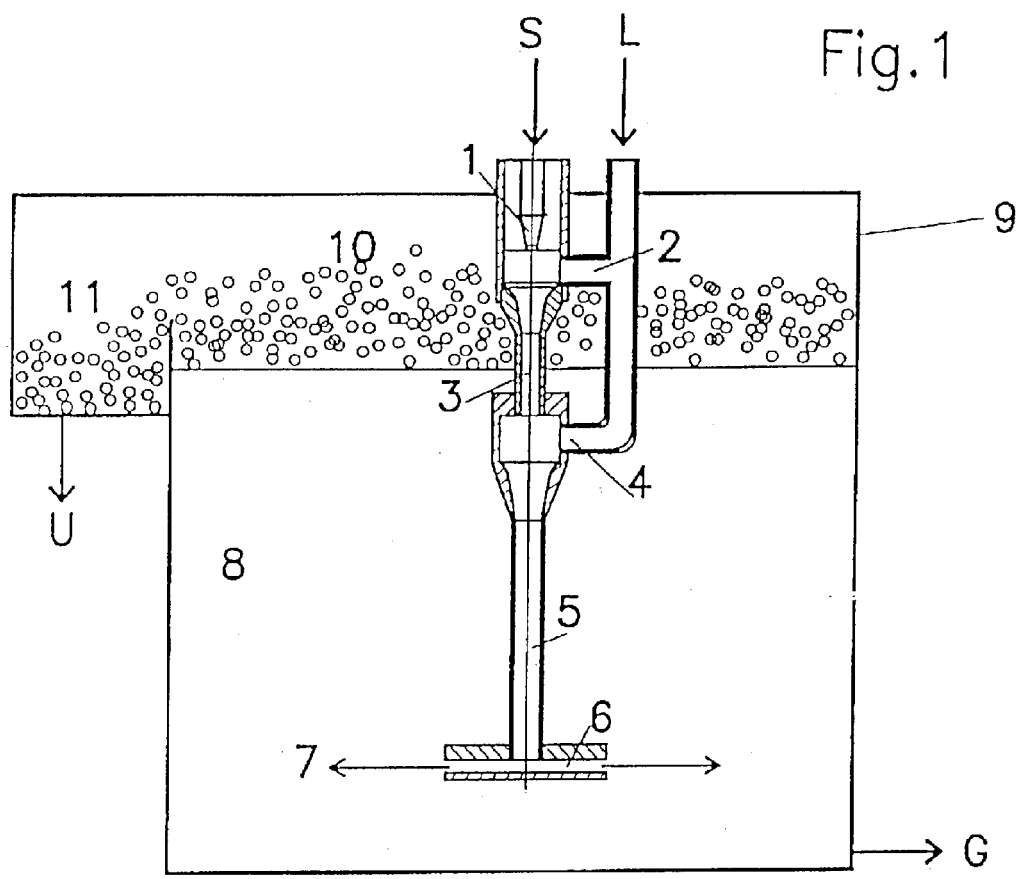
FIG. 1 is a cross section view of a flotation unit having an aerating device in accordance with the invention.

FIG. 1 shows a diagram of the flotation unit in which the device according to the invention is installed. The flotation cell 9 is largely filled with suspension 8, on the surface of which scum 10 forms, which contains as large a portion as possible of impurities and ink particles to be removed by flotation. This scum flows through a conduit 11 as overflow U. The pulp suspension S enters the injector through the propulsive jet nozzle 1. Due to the open jet principle, air is added at the first suction point 2 and mixed into the pulp suspension in the first impulse exchange pipe 3. The pulp suspension loosened in this way by the air bubbles sucks in more air 4 at the second suction point and this air is mixed into the suspension in the second impulse exchange pipe 5. The air suction points are connected in this case to a pipe protruding out of the suspension and into which air L enters at the surface of the suspension. The dispersion 7 of bubbles and pulp leaves the injector after passing through a radial diffuser 6 for energy recovery purposes. The bubbles formed in this way adhere to the hydrophobic impurities and carry them to the surface. The suspension cleaned by flotation leaves the flotation cell as accept pulp G.

Figure 2:
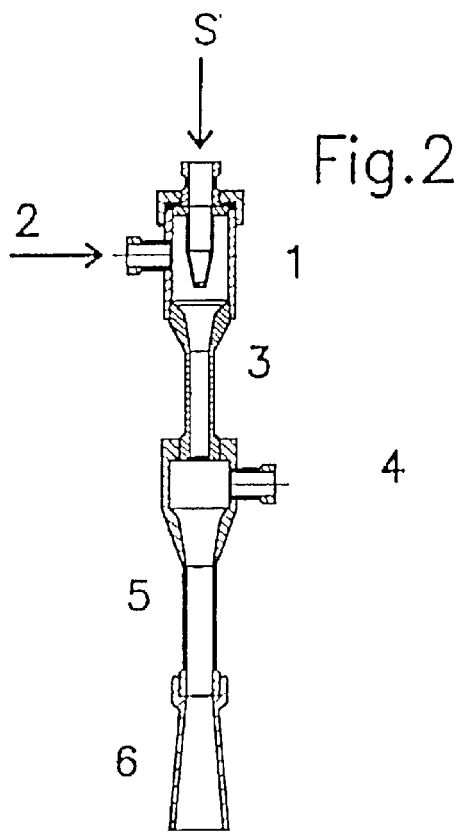
FIG. 2 is a cross section view of a second embodiment of an aerating device in accordance with the invention.

FIG. 2 contains an alternative variant of an injector according to the invention, where the gas intake fittings, for example, are mounted on different sides. A significant difference to FIG. 1, however, is that a conically widening diffuser is installed after the second stage.

Figure 3:
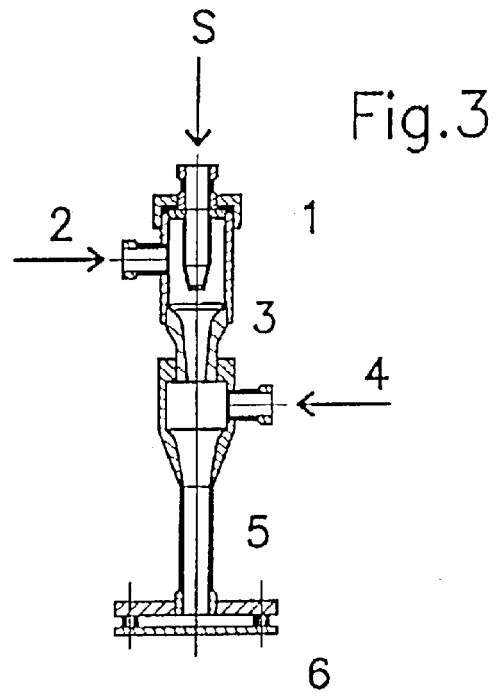
FIG. 3 is a cross section view of a third embodiment of an aerating device in accordance with the invention.

FIG. 3 shows a device according to the invention with a conically shaped first impulse exchange pipe 3, where a second propulsive jet nozzle is used analogous to the propulsive jet nozzle 1 so that high suction efficiency is also achieved in the second stage.

Figure 4:
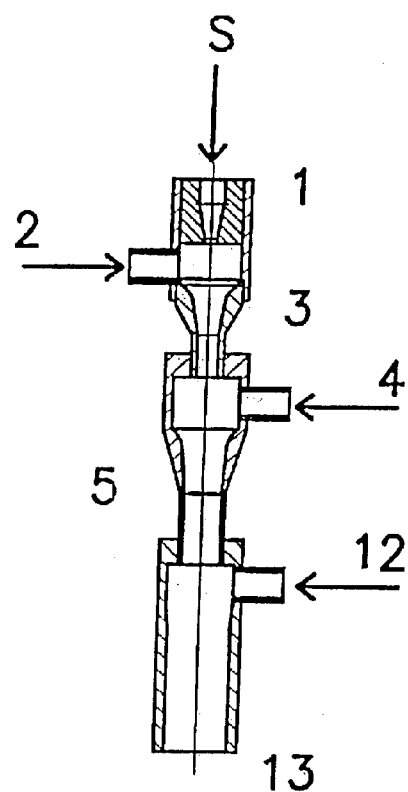
FIG. 4 is a cross section view of a fourth embodiment of an aerating device in accordance with the invention.

FIG. 4 contains a design according to the invention in which three air intake points 2, 4, 12 are provided, with a diffuser shown after the third impulse exchange pipe 13.

Figure 5:
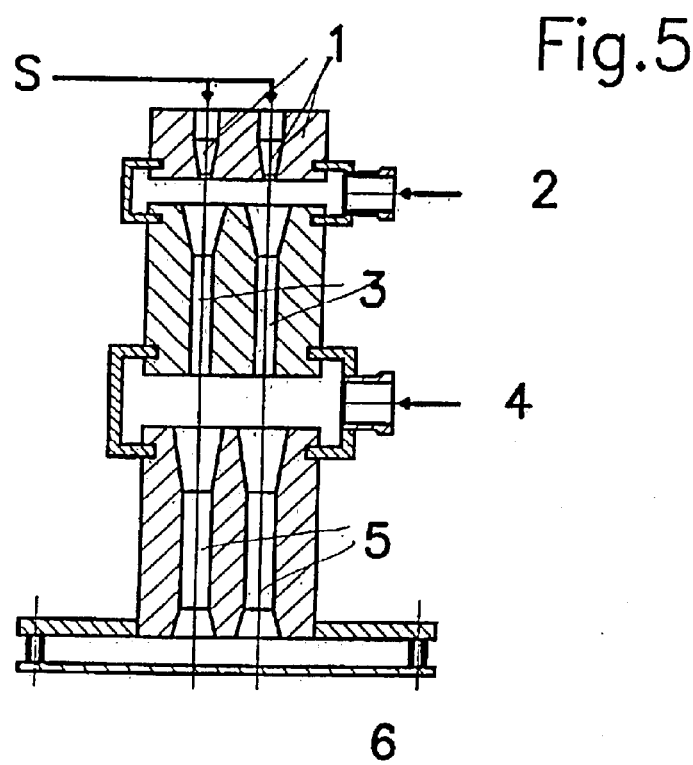
FIG. 5 is a cross section view of a fifth embodiment of an aerating device in accordance with the invention.

FIG. 5 shows a variant as injector group, where two injectors are mounted here in parallel beside each other. This arrangement comprises a top section, in which the propulsive jet nozzles 1 are mounted, a common intermediate area into which the air intake fitting 2 leads, also a block with impulse exchange pipes 3 operating in parallel. This block is connected in turn to a common intermediate area into which the gas intake pipe 4 leads. This is adjoined by a common block where the second impulse exchange pipes 5 are mounted. Finally, both impulse exchange pipes 5 lead into a radial diffuser 6. It would also be possible basically to combine several injectors in an injector group of this kind.

Figure 6:
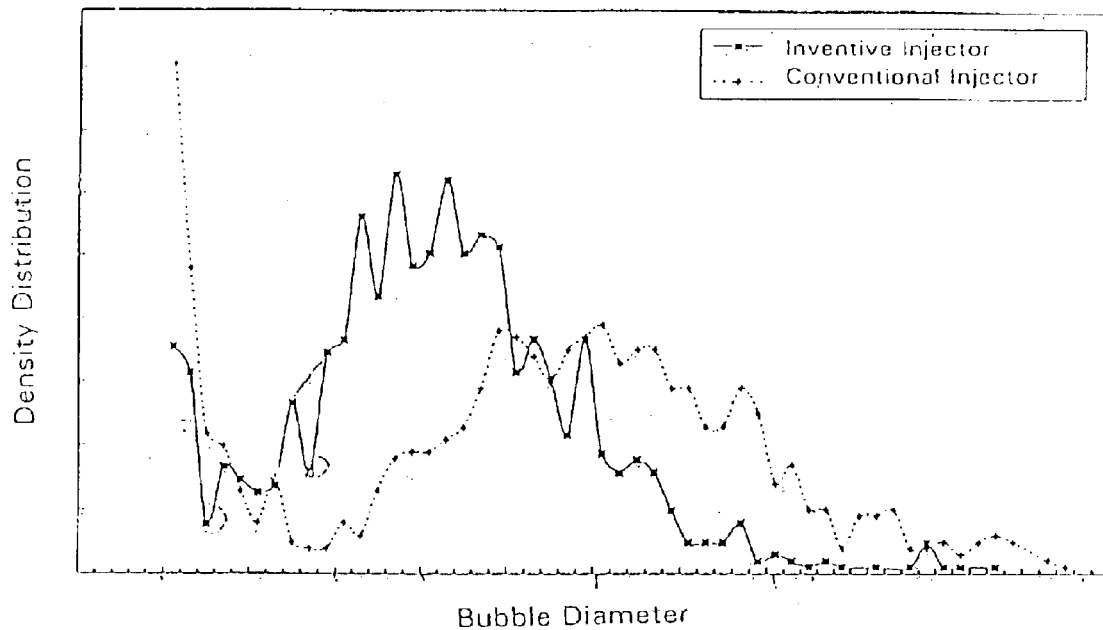
FIG. 6 is a graph comparing the bubble diameter distribution pattern of an aerating device in accordance with the invention to that of a conventional aerating device.

FIG. 6 now shows the bubble diameter distribution pattern of a conventional injector compared with that of an injector according to the invention. This shows that the injector according to the invention contains significantly fewer bubbles with a diameter <0.5 mm than the state-of-the-art injector. Here the reduction is approximately 50%. Unlike the conventional injector, however, the distribution spectrum is still retained. Overall there are fewer solids (fiber) losses as a result.

Figure 7:
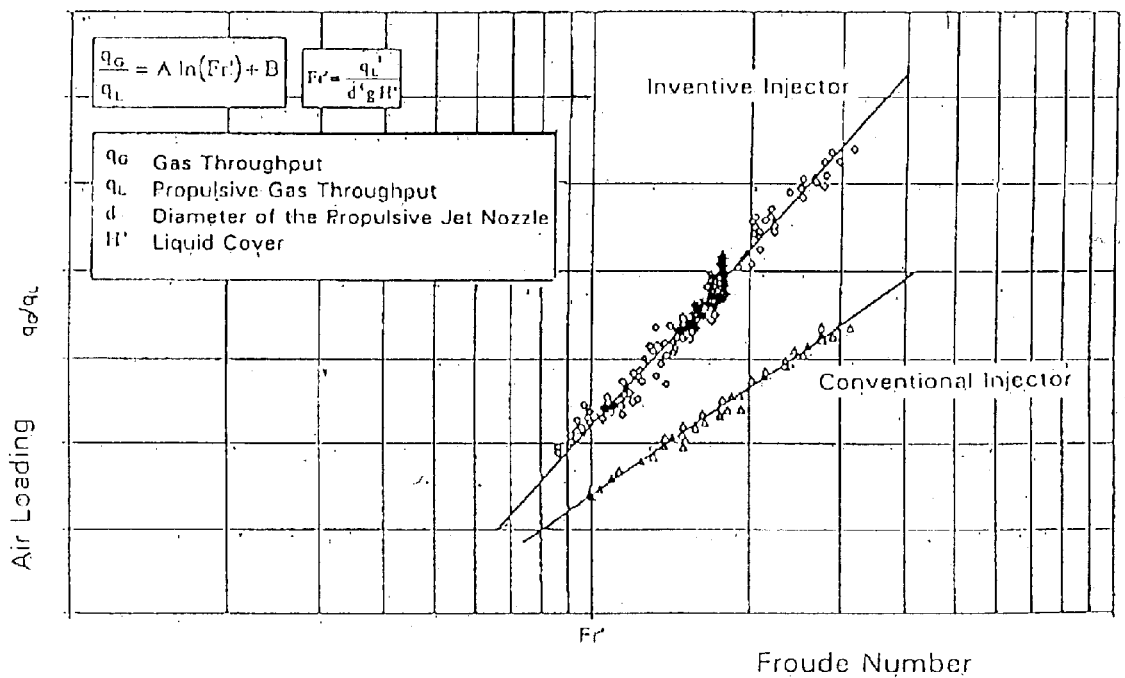
FIG. 7 is a graph comparing the air loading, as a function of the Froude number, of an aerating device in accordance with the invention to that of a conventional aerating device.

The suction effect of an injector is determined by the propulsive jet throughput, the diameter of the propulsive jet nozzles, the liquid cover and the density of the propulsive jet. Suction characteristics of this type are illustrated in FIG. 7. Here the air loading $q_G/q_L$ is shown as a function of the Froude number. The illustration shows that, compared with conventional injectors, this air loading can be increased significantly with the device according to the invention.

Figure 8:
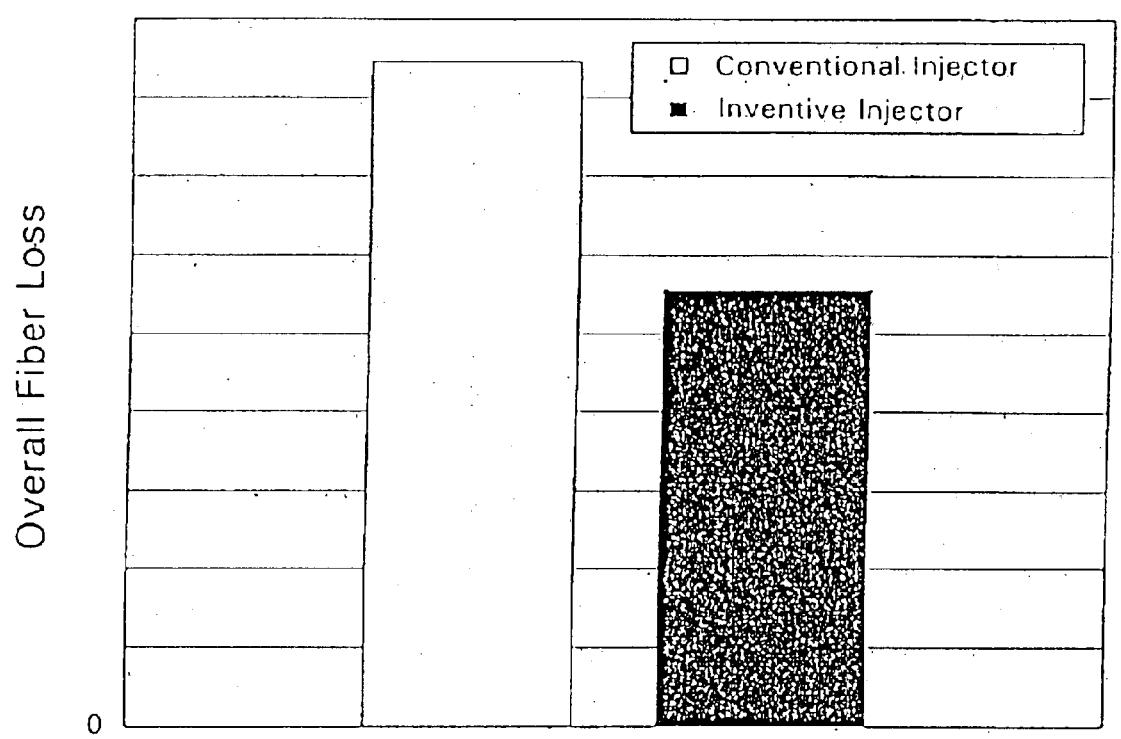
FIG. 8 is a graph comparing the overall fiber loss, at a given air intake, of an aerating device in accordance with the invention to that of a conventional aerating device.

FIG. 8 contains a diagram of a flotation result at the same air intake compared with that of a conventional injector. The diagram shows that the overall fibre loss could be reduced by approximately one third. With the present invention, however, it is possible to inject much more air and thus, also improve removal of impurities.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. Process for aerating pulp suspensions in a de-inking process with an injector having oppositely disposed inlet and discharge ends and an injection channel extending longitudinally from the inlet end to the discharge end, the injection channel having a first suction point and at least one, longitudinally spaced subsequent suction point, each of the suction points defining a suction stage, the process comprising the steps of:

receiving a pulp suspension in the de-inking process in the inlet end of the injector injecting a quantity of air into the pulp suspension in the injection channel by
      sucking in air at the first suction stage, and
      sucking in air at each subsequent suction stage,
      mixing the air with the pulp suspension after each suction stage; and discharging the mixed air and pulp suspension into a floatation tank of the de-inking process.

2. Process according to claim 1, wherein 20% to 95% of the quantity of air discharged from the injector is sucked in at the first suction stage.

3. Process according to claim 1, wherein the step of injecting a quantity of air also includes the substep of transferring the mixed air and pulp suspension in a free jet after the first suction stage.

4. Process according to claim 1, wherein the mixed air and pulp suspension discharged from the injector has an air loading of 50% to 150% of the suspension loading.

* * * * *